(12) United States Patent
Hein et al.

(10) Patent No.: US 10,073,257 B2
(45) Date of Patent: Sep. 11, 2018

(54) APPARATUS AND METHOD FOR TRANSMITTED LIGHT ILLUMINATION FOR LIGHT MICROSCOPES AND MICROSCOPE SYSTEM

(75) Inventors: Detlef Hein, Goettingen (DE); Axel Laschke, Gleichen (DE)

(73) Assignee: CARL ZEISS MICROSCOPY GMBH, Jena (DE)

(*) Notice: Subject to any disclaimer, the term of this patent is extended or adjusted under 35 U.S.C. 154(b) by 189 days.

(21) Appl. No.: 14/345,336

(22) PCT Filed: Aug. 16, 2012

(86) PCT No.: PCT/EP2012/003496
§ 371 (c)(1),
(2), (4) Date: Oct. 10, 2014

(87) PCT Pub. No.: WO2013/041171
PCT Pub. Date: Mar. 28, 2013

(65) Prior Publication Data
US 2015/0062447 A1    Mar. 5, 2015

(30) Foreign Application Priority Data
Sep. 23, 2011  (DE) .................. 10 2011 114 210

(51) Int. Cl.
*G02B 21/06*    (2006.01)
*G02B 21/02*    (2006.01)
(Continued)

(52) U.S. Cl.
CPC .......... *G02B 21/06* (2013.01); *G02B 21/025* (2013.01); *G02B 21/086* (2013.01); *G02B 21/26* (2013.01)

(58) Field of Classification Search
CPC ..... G02B 21/06; G02B 21/086–21/125; G02B 21/18–21/22; G02B 21/32; G02B 21/361; G02B 21/025; G02B 21/26
(Continued)

(56) References Cited

U.S. PATENT DOCUMENTS

| | | | |
|---|---|---|---|
| 4,643,540 A | 2/1987 | Kawasaki et al. | |
| 7,133,199 B2 | 11/2006 | Hayashi | |

(Continued)

FOREIGN PATENT DOCUMENTS

| | | |
|---|---|---|
| DE | 102004056685 A1 | 6/2006 |
| DE | 102007005790 A1 | 8/2008 |
| JP | 2007017901 A | 1/2007 |

OTHER PUBLICATIONS

International Application No. PCT/EP2012/003496, Preliminary Report on Patentability, dated Mar. 25, 2014, 7 pages.
(Continued)

*Primary Examiner* — Marin Pichler
(74) *Attorney, Agent, or Firm* — Hoffman Warnick LLC

(57) ABSTRACT

The invention relates to an apparatus for transmitted light illumination for light microscopes having changing effective entrance pupil of an objective. The apparatus has a light source for emitting an illuminating light beam, and a holding device for holding a sample to be examined, and at least one diaphragm edge for trimming the illuminating light beam bundle, wherein the diaphragm edge is arranged between the holding device and the light source and extends transversely to an optical axis, wherein a beam path of the illuminating light between the diaphragm edge and a sample held by the holding device is free from beam focussing components. The apparatus is characterized in that the means are provided for enquiring concerning a microscope setting and/or a microscope configuration of a light microscope, which means are positionable at the device for transmitted light
(Continued)

illumination; means are provided for variable positioning of the diaphragm edge in a direction transverse to the optical axis, and a control device is provided and configured to position the diaphragm edge in the direction transverse to the optical axis via the means for variable positioning. The invention also relates to a method for transmitted light illumination for a light microscope and a microscope system.

12 Claims, 10 Drawing Sheets

(51) Int. Cl.
*G02B 21/26* (2006.01)
*G02B 21/08* (2006.01)

(58) Field of Classification Search
USPC .................................. 359/380–381, 388–389
See application file for complete search history.

(56) References Cited

U.S. PATENT DOCUMENTS

| | | |
|---|---|---|
| 2001/0005280 A1 | 6/2001 | Ouchi |
| 2004/0190129 A1 | 9/2004 | Peter et al. |
| 2005/0259320 A1* | 11/2005 | Fujimura ............. G02B 21/086 359/385 |
| 2006/0291031 A1 | 12/2006 | Boehm et al. |
| 2007/0097498 A1* | 5/2007 | Knoblich ............... G02B 21/06 359/388 |
| 2009/0303582 A1 | 12/2009 | Karasawa |

OTHER PUBLICATIONS

International Application No. PCT/EP2012/003496, International Search Report, dated Nov. 9, 2012, 2 pages.

* cited by examiner

APPARATUS AND METHOD FOR TRANSMITTED LIGHT ILLUMINATION FOR LIGHT MICROSCOPES AND MICROSCOPE SYSTEM

TECHNICAL FIELD

The present invention relates in a first aspect to a device for transmitted light illumination for light microscopes, with a changing effective entrance pupil of an objective.

According to a further aspect, the invention relates to a method for transmitted light illumination for a light microscope with changing effective entrance pupil of an objective. In addition the invention relates to a microscope system.

RELATED ART

A generic apparatus for transmitted light illumination for light microscopes is described for example in DE 10 2004 056 685 A1 and comprises a light source to emit an illuminating light beam and a holding device for holding a sample to be examined. Furthermore, at least one diaphragm edge for trimming the illuminating light beam is provided, said diaphragm edge being arranged between the holding device and the light source and extending transversely to an optical axis, in particular of an objective, of a light microscope which can be positioned in an operating state on the apparatus for transmitted light illumination. A beam path of the illuminating light between the diaphragm edge and a sample held by the holding device is thereby free of adjustable beam-focussing components.

In the case of a generic method for transmitted light illumination for a light microscope with changing effective entrance pupil of an objective, a sample held by a holding device is exposed to illuminating light from a light source and in which an illuminating light beam bundle emitted from the light source is trimmed by a diaphragm edge arranged between the holding device and the light source, wherein in particular a beam path of the illuminating light between the diaphragm edge and the sample held by the holding device may be free of adjustable beam-focussing components.

DE 10 2004 056 685 A1 describes a lighting device with two pivotable diaphragms. The pivot point of the diaphragms is thereby fixed and cannot be displaced. In addition there are no means for detecting, storing and/or reproducing the illumination settings of the pivotable diaphragms or pre-settings automatically adapted to the object. The lighting device described in DE 10 2004 056 685 A1 therefore lacks ease of use.

DE 10 2007 005 790 A1 describes a diaphragm arrangement in a transmitted light optical path. The diaphragm arrangement comprises four diaphragm segments which are displaceable relative to each other in a plane perpendicular to an optical axis. A setting of the diaphragms is to be adjusted manually which hampers operation.

It is also a disadvantage of the described illumination devices that setting a correct transmitted light illumination is very time consuming and also requires a certain base knowledge. Therefore, optimal illumination settings are often not found or only by chance. Due to the quantity of adjustment possibilities and operating elements the settings once found can generally not be exactly reproduced.

The prior art is explained in more detail with respect of FIGS. 1 and 2.

FIG. 1 shows a typical stereo microscope arrangement according to the prior art. A transmitted light device DL illuminates the object field with a diameter OF, located in the plane OE, which is identified by the highest lying surface of the transmitted light device DL. On the transmitted light device DL there is a motorised focussing device MFT which can be operated by means of an operating unit BMFT and on which a carrier TR with a coded objective changer (COW) is arranged. By means of the objective changer COW, three objectives OBJ1, OBJ2, OBJ3 can be used with different properties. For example the objective OBJ2 has, besides a further objective magnification with the smallest zoom factor $\beta$, also an entrance pupil which clearly lies at a greater distance from the object plane OE than the other two objectives. In FIG. 1, BMAB identifies an operating element for a motorised aperture diaphragm MAP. A plane at the level of the object support on the transmitted light device is identified by an E. MFT identifies a motorised focussing device.

On the carrier TR, there is a motorised zoom body MZK which can be used via an operating unit BMZK. On the motorised zoom body MZK there is an objective barrel T, with which the stereo microscope image can be observed directly by the two oculars OK. In addition the objective barrel T also facilitates documentation of the images seen by means of a connected camera K.

The transmitted light means DL according to the prior art which is not motorised is supplied with light by a cold light source KLD via a fibre optic light conductor LL. It has three manually settable operating elements SR1, SR2, SR3 for varying the light settings.

The whole system is controlled by the electronic module EM and the operating unit BE connected thereto. Communication within the whole system is achieved for example by means of a CAN bus.

For further observation, a coordinate system with the coordinate axes X, Y and Z is introduced. The coordinate origin lies in the centre of the object plane OE. For reasons of simplification, in this illustration the focus is on the upper side of the transparent object support TOA, that is to say OE is identical to the upper side of the transparent object support TOA and lies in the plane which spans across the coordinate axes X and Y. The positive half axes point, as seen by the user, in the following directions: X to the right, Y to the rear, Z upwards. The Z axis is identical to the optical axis OA of the momentarily connected objective.

For stereomicroscopes and macroscopes, there are numerous transmitted light illumination methods which cannot provide a suitable illumination for all possible imaging conditions, this being mainly due to the zoom function of the zoom body MZK. This applies in particular to the region of overview, that is to say for the smaller zoom factors of the zoom body. The lighting of stereo microscopes and macroscopes is frequently homogenised with suitable means, for example with milk glasses. This does indeed allow the homogeneity of the lighting to be improved but the contrast and brightness decrease correspondingly due to the light distribution across large spatial angle regions and the detrimental scattering light increases. The correspondingly illuminated overview images thus provide only very poor contrast. Many details can only be recognised with larger zoom factors $\beta$. The required zooming-in and zooming-out thereby require a long time and the overview is lost during the zoom process with larger zoom factors $\beta$.

FIG. 2 shows the operating principle of a known transmitted light device DL from FIG. 1. The front area FF of the light conductor LL is approximately imaged at infinity by means of an asphere ASPH. This means that the light beams output from a common point of the front area FF of the light conductor extend behind the asphere in parallel. By way of example, FIG. 2 shows the light beams ST1 ST2, ST3, ST4 and ST5 starting from a common point on the light conductor LL. Behind the asphere ASPH there is a deflection mirror SP which can be moved or rotated in different directions via the three operating elements SR1, SR2, SR3 shown in FIG. 1.

By means of the operating unit SR1, the mirror SP is rotated about the rotation axis DA as far as the desired adjustment angle α, whereby the light beams contacting the deflection mirror SP can be deflected in the respective directions. The operating unit SR2 allows the deflection mirror SP to be moved together with the rotation axis DA in the displacement direction VR. The light beams reflected by the deflection mirror SP thereby enter, in dependence upon the mirror position, at various points through the transparent object support TOA and the object plane OE.

By means of the operating element SR3, the deflection mirror SP is moved in the X direction, thus perpendicular to the illustration plane. Without changing the mirror geometry, another mirror surface is thereby effectively created with deviating reflection properties. None of the two usable mirror surfaces has 100% reflection orientation, that is to say they reflect with scattering diffusion, wherein the scattering proportion of the two mirror surfaces differs. In order to achieve illumination which is as homogeneous as possible, the greater scattering mirror surface is to be used, whereby the contrast is impaired and the image brightness decreases. A rotationally symmetric transmitted light bright field illumination can be achieved if the deflection mirror SP is adjusted such that the main beam, i.e. the light beam ST1, enters the objective OBJ1 exactly along the optical axis OA of the objective. This is the case if the setting angle α=45° and the impinging spot of the light beam ST1 is on the deflection mirror SP on the optical axis OA of the objective OBJ1. The deflection mirror SP redirects in this case the light, which comes from behind from the positive Y direction, upwards in the direction of the positive Z axis.

At the expense of homogeneity, the contrast can increase if the weaker scattering mirror surface is used. This corresponds more to a directed illumination. With larger magnifications a significant contrast enhancement can be reached with a still sufficient homogeneity if an oblique illumination is used. For this end, the deflection mirror SP is rotated and displaced in the displacement direction VR so far that the objective OBJ1 is illuminated in the desired way. A further contrast enhancement can be seen if the mirror edges are used, i.e. if jump-like brightness differences in the illumination can be used for contrast enhancement. This effect, however, only applies in relatively small regions of the object field, that is, homogeneous illuminations for larger overview object fields cannot be realized in this way.

The adjustment of the described illumination parameters requires certain experience to be held by the operator, i.e. untrained users might not have the skills to use the lighting adjustment via the three operating elements SR1, SR2, SR3 without further assistance.

Transmitted light devices DL, which contain an inclinable deflection mirror SP according to FIG. 2 also require a relatively large construction height in order to illuminate larger object fields, this being due to construction reasons. In spite of this, the achievable homogeneity and contrasting is not yet optimal even with a large structural height with this arrangement.

In case of normal light microscopes and some macroscopes, transmitted light illumination methods are known which require a fixed pupil plane. In most cases, then, contrast-increasing elements are brought into the light beam path and/or the imaging beam path, in particular into the objective pupil or a plane conjugated therewith. This requires extremely great resources and can only be achieved, if at all, with great limitations on zoom systems, and thus on stereo microscopes and macroscopes. These conventional methods only function with special objectives with expensive accessories, for example DIC sliders and only in certain zoom regions. The optical design requires unfavourably large installation spaces as well as strain-free optics for polarisation methods. In addition a possibility must be provided in the illumination device for manipulating the contrast-increasing elements and in general also a possibility for adaptation to different sized object fields through exchangeable condenser lenses. These solutions are therefore only suitable for special applications and in addition are very expensive.

All solutions according to the prior art require great resources in their realisation and/or leave much to be desired in terms of usability and user-friendliness.

SUMMARY OF THE INVENTION

It can be seen as an object of the invention to create an apparatus and a method for transmitted light illumination for light microscopes and a microscope system based thereon, which is to be realised in principle with simple technical means. In addition, ease of use is to be improved in comparison with the prior art.

Advantageous embodiments of the device according to the invention and preferred variants of the method according to the invention are explained below with reference to the dependent claims and in particular in connection with the attached drawings.

An apparatus of the above-mentioned type is further developed according to the invention in that means for enquiring concerning a microscope setting and/or a microscope configuration of a light microscope are provided, which can be positioned at the transmitted light illumination apparatus, means for variable positioning of the diaphragm edge in a direction transverse to the optical axis are provided, and furthermore a control device is provided which is configured to position the diaphragm edge in the direction transverse to the optical axis in dependence upon the microscope setting and/or a microscope configuration via the means for variable positioning of the diaphragm edge.

According to the invention, the method of the above-described kind is further developed in that a microscope setting and/or a microscope configuration is determined and in that the diaphragm edge extends transversely to an optical axis and is positioned in a direction transverse to the optical axis in dependence upon the microscope setting and/or the microscope configuration.

In addition protection is claimed for a microscope system which has a light microscope and an apparatus for transmitted light illumination.

A first core idea of the invention can be seen in that the illuminating light emitted by the light source can be trimmed with a diaphragm edge, wherein the diaphragm edge can be adjusted in a direction traverse to the optical axis dependent on the microscope setting and/or the microscope configuration of the connected light microscope.

The positioning of the diaphragm edge can preferably be realised automatically following a request by a user in dependence upon the microscope setting. Properties of the imaging system can thus be automatically considered.

According to a particularly simply structured variant, no beam-focussing components whatsoever, in particular no beam-forming components, are present between the diaphragm edge and the sample.

The term "optical axis" is intended in the present description to mean essentially and as a rule the optical axis of an objective of a light microscope which is arranged or positioned in an operating state on the apparatus according to the invention for transmitted light illumination.

If the connected light microscope is a stereo microscope with mid-light beams LM and RM inclined relative to each other, the term "optical axis" can mean:
i) the optical axis of the objective in the case in which the objective only symmetrically detects an observation channel;
ii) the angle bisector between the two mid-light beams if the two observation channels are detected through the objective, or, however,
iii) the mid-light beam of only one channel if only one observation channel is not symmetrically detected.

The term "optical axis" can also be defined having regard to the apparatus according to the invention for transmitted light illumination itself in the sense that essentially the direction is meant, in which the illuminating light is radiated. In the usual case the apparatus for transmitted light illumination according to the invention is formed as a substantially flat box which lies for example on a laboratory table. In this case the optical axis points in the direction of the vertical direction, thus in the Z direction.

The term "holding device" is to be functionally interpreted for the purposes of the present invention, i.e. each means is meant, with which a sample to be examined can in some way be positioned relative to the illuminating light beam and the optics of a light microscope to be connected.

The term "effective entrance pupil" is to be interpreted in terms of phenomenon. Accordingly it is not a calculated or theoretical entrance pupil of the optical system, but instead in fact the region, in which a waist of the illuminating light beam has a minimum cross section, wherein with the illuminating light beam only beam portions are meant that actually contribute to the imaging. This plane region, in the present case referred to as the effective entrance pupil, is determined by measuring, thus testing. In practice the position of this effective entrance pupil depends on the optics used and also upon the sample examined and sample holders such as object carriers or other transparent sample supports and in case of usual zoom microscopes is not a well-defined flat plane.

The microscope setting preferably comprises at least the utilised objective, a utilised zoom body and a magnification set with the zoom body. With knowledge of these components, the diaphragm edge can be moved to an optimal position which can have been previously determined and stored for the utilised objective-zoom body combination. The optimal position can correspond in particular along the direction of the optical axis to the position of the entrance pupil. At this position, the illuminating optical path of the light microscope has a waist.

A microscope configuration usefully comprises at least a type of zoom system and/or a type of a selected objective. The terms "microscope type" and "type of zoom system" can be used synonymously.

A microscope setting usefully contains at least one zoom magnification and/or one position of a selected objective.

According to a particularly preferred variant of the apparatus according to the invention, means for variable positioning of the diaphragm edge along the direction of the optical axis are present to adapt the optical path of the illuminating light to the effective entrance pupil of the objective, wherein a position of the diaphragm edge along the direction of the optical axis can be varied independently of a position of the diaphragm edge transversely to the optical axis. The essential idea of this development is that the diaphragm edge along the direction of the optical axis is adjusted in dependence upon the position of the effective entrance pupil of the optical system.

According to a preferred embodiment of the apparatus according to the invention, means are additionally provided for enquiring concerning a microscope type of a light microscope which can be positioned on the apparatus for transmitted light illumination, and the control device is adapted, in dependence upon the microscope type, to position the diaphragm edge with the means for variable positioning of the diaphragm edge in a direction transversely to the optical axis.

The control device can hereby be adapted to realise different position settings of the diaphragm edge at least for the following microscope types: stereo microscope with one channel to be illuminated, stereo microscope with two channels to be illuminated, stereo microscope with one channel to be illuminated and one excitation channel for fluorescence excitation, stereo microscope with two channels to be illuminated and one excitation channel for fluorescence excitation and also a macroscope with one channel to be illuminated. The channels constitute separate beam progressions through at least in part the same optical components, in particular through the objective and a zoom body. For optimal illumination, solely the respective channel to be illuminated is to be illuminated with the illuminating light bundle. Other light, on the other hand, does not contribute to the image and leads to scattered light.

A setting of the diaphragm edge in a direction transversely to the optical axis is usually necessary to illuminate a certain channel. For this, a variant of the apparatus according to the invention is useful, wherein means for variable positioning of the diaphragm edge in a direction transversely to the optical axis are present and the control device is adapted, in dependence upon the microscope setting and/or microscope configuration, to position the diaphragm edge with the means for variable positioning of the diaphragm edge in a direction transversely to the optical axis. The diaphragm edge can accordingly also be positioned in a direction transversely to the optical axis in order to set the contrast.

According to a preferred variant of the apparatus according to the invention the means for enquiring concerning a microscope type and/or the means for enquiring concerning a microscope setting and/or a microscope configuration have an electrical interface, in particular a Controller Area Network (CAN) bus. Alternatively, an optical interface or an Ethernet connection can also be used. Either this same interface can be used both for the means for enquiring concerning a microscope type and also for the means for enquiring concerning a microscope setting and/or a microscope configuration, or separate interfaces can be provided.

Having regard to the diaphragm(s), in principle only the technical effect is important that certain light rays remain unimpaired by the diaphragm edge, whereas other light rays are removed from or filtered out of the light beam. This function can be realised by a mechanical diaphragm, but in principle also through electronically controllable liquid crystal arrays or LCD arrays.

At least two diaphragm edges which can be moved relative to each other are particularly preferably present to trim the illuminating light bundle between the holding device and the light source. The control device is adapted to position the at least two diaphragm edges in dependence upon the microscope setting and/or microscope configuration. Having regard to the reduction of scattered light, further improvements can hereby be achieved. In addition it can be useful, for certain positions of the effective entrance pupil, to have a further variably positionable diaphragm available.

A simple manufacture and a particularly good scattered light reduction are achieved if the diaphragms are offset relative to each other along the direction of the optical axis and the movement regions overlap each other.

The diaphragms preferably surround a central opening area completely. By moving the diaphragms, it is thereby possible to displace an area central point of the opening area transversely to the optical axis. This is achieved in a simple way according to an embodiment of the apparatus according to the invention with four diaphragms which each have a linear diaphragm edge. When using two diaphragms, curved or L-shaped diaphragm edges are preferred in such a way that the opening area between the diaphragms can already be completely surrounded with two diaphragms.

According to a further preferred embodiment of the apparatus according to the invention, one of the at least two diaphragm edges is formed by an iris diaphragm. Since, for many types of microscopes, at least some of the channels to be illuminated are round in shape, an iris diaphragm facilitates a good adaptation of the region illuminated by the light source to the channels of the microscope type to be illuminated.

For a microscope type having two channels to be illuminated, a good approximation can be realised through an iris diaphragm and two further diaphragms each having a linear diaphragm edge. The two linear edges trim the circle formed by the iris diaphragm on opposite sides so that merely the region between the two channels to be illuminated is unnecessarily illuminated.

According to a further preferred variant of the apparatus according to the invention the control device has a storage device, in which position settings of the at least one diaphragm edge are stored for positioning the at least one diaphragm edge in dependence upon a microscope setting and/or a microscope configuration. For this, advantageous positions can have been determined and stored in reference measurements with different microscope settings and/or microscope configurations. The stored position is adopted as soon as a currently used system environment has been detected with the means for enquiring concerning a microscope configuration and the means for enquiring concerning a microscope setting. The microscope configuration can thereby comprise the type of zoom body and the objective present in the optical path. The microscope setting can comprise the zoom position of the zoom body and the objective position (2D, 3D position).

According to a preferred variant of the apparatus according to the invention an operating element is present, via which position data concerning a set position of the at least one diaphragm edge can be stored in the storage device and retrieved by a user. Positions set individually by the user can thus advantageously be stored and later retrieved again.

Illuminating light which enters the optical system from locations outside of the entrance pupil, thus the microscope objective, cannot contribute there in the transmitted light brightness field image to the image itself but instead only to the scattered background. This is undesirable and gives rise to a further advantageous method variant, in which an illuminating area/source of the light source is adapted to an actually effective back-projection of the illuminating light. This means that parts of the illuminating area which cannot provide illuminating light contributing to the image are filtered out at the start. To this end, according to the apparatus according to the invention, at least one further diaphragm is advantageously present, which is positioned directly next to the light source, in order to vary an effective illuminating area.

Whether and to which extent improvements in contrast can be reached with an oblique illumination depends on the respectively examined specimen. In this context a further embodiment of the inventive apparatus is advantageous in which means for rotating the diaphragm edge about the optical axis are present. That means that the direction can be varied in which the middle beam direction is inclined relative to the optical axis in an oblique light illumination. If the inventive apparatus is used with a macroscope, thus the same is principally achieved as if rotating the specimen about the optical axis. A crucial advantage is here that the specimen as such can remain unvaried in the holding device and thus need not be modified in its position.

With regard to the imaging quality, contrast and brightness of the specimen, the results achieved depend strongly on the spatial position of the diaphragm edge as the illumination can be strongly varied and adjusted with the diaphragm edge.

In a particularly preferred embodiment of the inventive device for displacement of the diaphragm edge in the direction of the optical axis and the direction transverse to the optical axis, for instance, a carriage mechanism with a first carriage and a second carriage is present. For driving these carriages, step motors can be used which allow a precise positioning.

The method according to the invention can be realised in particular with the apparatus according to the invention for transmitted light illumination. For this, according to an advantageous variant of the microscope system according to the invention, a control device is present which is connected to components of the light microscope and the apparatus for transmitted light illumination and is adapted to control the microscope and the apparatus for transmitted light illumination to realise a method according to the invention.

According to a particularly preferred variant of the method according to the invention the diaphragm edge is positioned in a plane of an effective entrance pupil of the objective. In particular the diaphragm edge can be arranged in a direction transversely to the optical axis in such a way that it just contacts the entrance pupil in a direction transversely to the optical axis. An advantageous technical effect is thereby achieved in that a considerable part of the illuminating light, which could have contributed to the scattered light without the diaphragm is now filtered out.

The positioning of the diaphragm edge in the plane of the entrance pupil thus opens up the possibility of achieving an inclined light illumination in that the diaphragm edge covers a part of the entrance pupil. It is particularly preferable for the diaphragm edge to trim the illuminating light bundle asymmetrically in these embodiments. This means that certain rays of the illuminating light are selected and result in an inclined light illumination. In practice, advantageous improvements in contrasting can thus be achieved.

According to a further preferred variant of the method according to the invention, different position settings of the diaphragm edge are offered to a user for a microscope setting used and/or for a microscope configuration used. The different position settings are optimised having regard to a respective illumination parameter, wherein the illumination parameters are a measure for an intensity gradient of a microscope image in a direction transversely to the diaphragm edge, an image contrast of the microscope image, a contrast range, image homogeneity and/or a shadow in the microscope image. A user can accordingly select whether the diaphragm edges are to be positioned for example for an optimal image contrast of the microscope image or for a minimum intensity gradient of the microscope image.

The different position settings can be determined beforehand by initially varying the position of the diaphragm edge along the direction of the optical axis of the objective and a microscope image being at least partially recorded for each position of the diaphragm edge along the direction of the optical axis. An illumination parameter is then determined for each microscope image and the position of the diaphragm edge along the direction of the optical axis, at which a curve of the illumination parameter plotted against the position of the diaphragm edge along the direction of the optical axis has a predetermined characteristic, is fixed and stored as an optimal position of the diaphragm edge. This characteristic can then be recorded for each relevant zoom position of the microscope. Intermediate positions can be interpolated later.

The position of the diaphragm edge, where the intensity gradient plotted against the position of the diaphragm edge along the direction of the optical axis has a zero passage, can be fixed as a position which is optimised having regard to an intensity gradient.

According to a preferred exemplary embodiment of the microscope system according to the invention, a motorised aperture diaphragm for setting an observation aperture is present in an imaging optical path of the light microscope and the control device is adapted to position the aperture diaphragm in dependence upon a position of the at least one diaphragm edge. The diaphragm position of the motorised aperture diaphragm can be determined for example via a coding. In order to improve contrast the observation aperture of the imaging system can be adapted to the illumination settings and, if required, be stored and reproduced with the illumination settings.

According to a further preferred variant of the microscope system according to the invention the light microscope has a coded objective changer. With this, it is output which objective is pivoted into the optical path of the light microscope. Magnification values and objective types of the objectives of the objective changer are stored in a memory of the microscope or of an external computer and can be enquired with the means for enquiring concerning a microscope setting.

BRIEF DESCRIPTION OF THE DRAWINGS

Further advantages and features of the apparatus according to the invention, the method according to the invention and the microscope system according to the invention are explained below by reference to the drawing, in which.

Similar components and those which work similarly are provided with the same reference numerals in the drawings. Reference is also made to the list of reference numerals at the end of the description.

From the known data of different objectives OBJ1, OBJ2, OBJ3, the outermost rays/edge beams on the image side can be determined and depicted together with a back projection of these imaging outermost rays back into the illumination area, each in conjunction with a motorized zoom body MZK and depending on the zoom factor β.

DETAILED DESCRIPTION OF THE INVENTION

Figure 1:
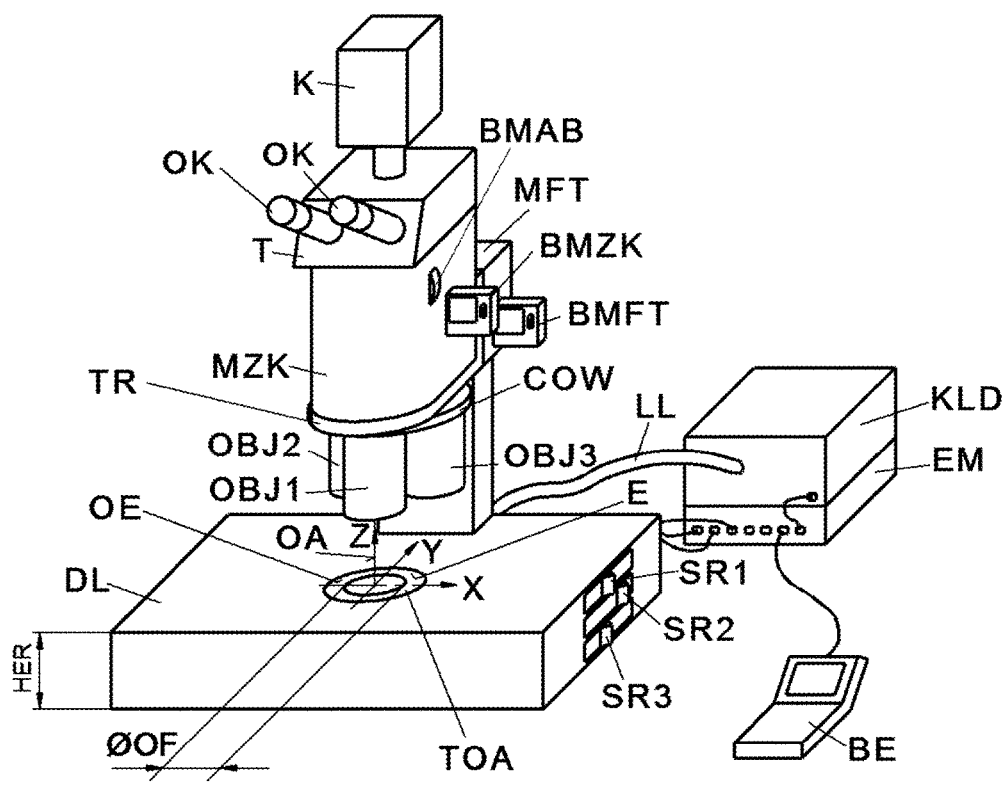
FIG. 1: shows a microscope system according to the prior art.
Figure 2:
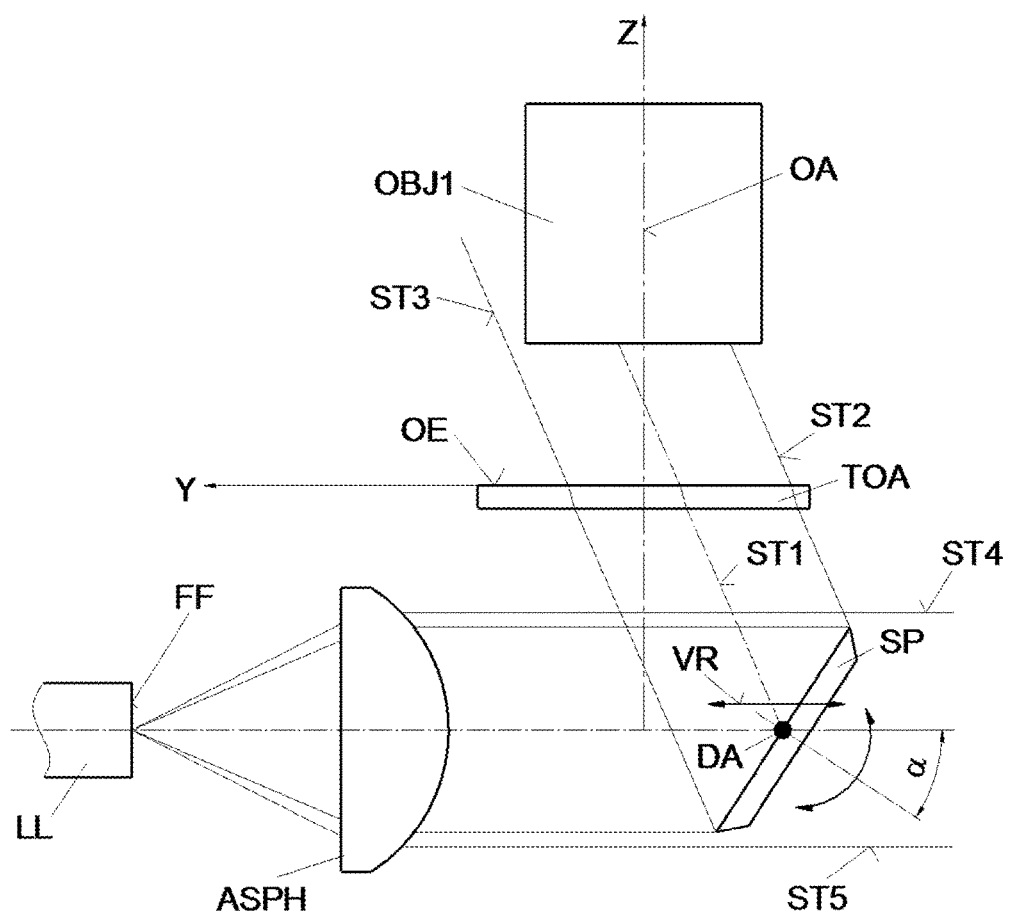
FIG. 2: shows a sketch to illustrate a transmitted light device according to the prior art.
Figure 3:
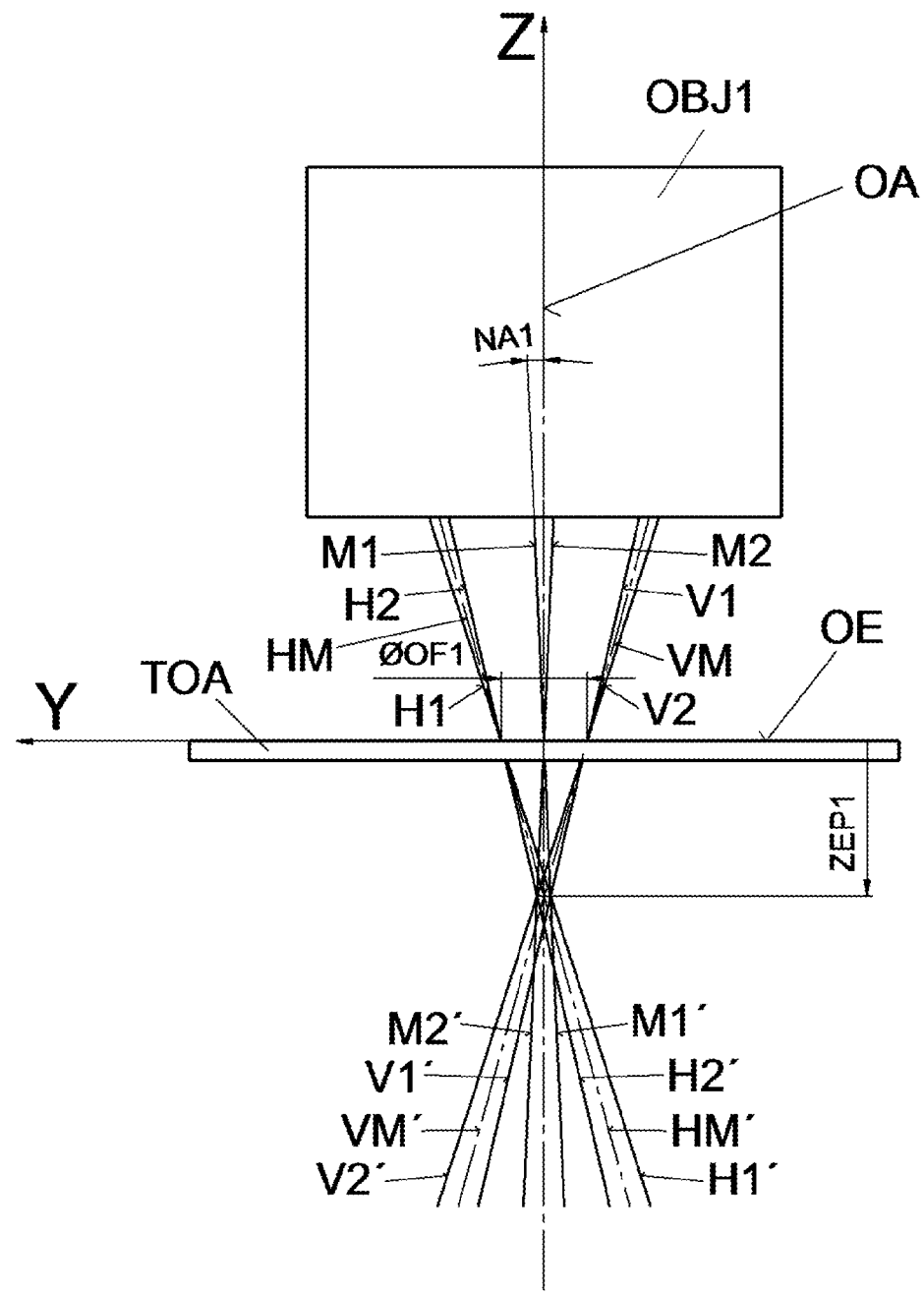
FIG. 3: shows an overview of essential components of the beam path in an apparatus according to the invention in a side view.

FIG. 3 shows the side view of the beam path with the objective OBJ1 of FIG. 1, which, together with the motorised zoom body MZK (not shown in FIG. 3) and the currently effective zoom factor β, has a numerical aperture NA1, an object field diameter OF1 in the object plane OE and a Z coordinate of the entrance pupil ZE1. The coordinate system with the axes X, Y and Z aids orientation.

Starting from the object plane OE, the boundary light beams are shown which are particularly relevant for the description of the illustration through the depicted lens OBJ1.

The light beams H1 and H2 as well as the middle light beam HM start from the rear object field edge, wherein the light beams H1 and H2 represent the theoretical aperture limitations of the objective OBJ1 as shown with the effective zoom factor β. Analogously the light beams V1, V2 and VM start from the front object field edge, wherein V1 and V2 designate the theoretical aperture limits of the objective OBJ1 shown for the momentarily effective zoom factor β.

In practical use there is generally a transparent object support TOA which produces, due to the refraction index differences and thickness, a beam offset, thus an extension of the actually effective optical distances. Both the optical effectiveness of the transparent object support TOA with a thickness DG and a refractive index nG as well as the corresponding optical properties of the object OB with an object height OH and a refractive index nO must be considered. Local curvatures of the object OB and/or refractive index fluctuations, for example through air bubbles inclusions etc., also lead to a change in the optical path and are to be considered in principle.

There is thus a beam offset SV in Z direction which can easily be calculated on the basis of the known properties of TOA, namely thickness and refractive index transitions and while disregarding the properties of the object OB.

The following formula applies in air:

$$SV = DG * (nG-1)/nG$$

In case of a typical thickness of for example DG=4 mm and nG=1.5, this results in a beam offset SV=1.3 mm.

This calculation applies, however, only for an idealised transparent object support TOA without an object OB and works on the basis of the known optical data. During practical use, the object OB is frequently surrounded by further media, for example Petri dishes with nutrient solutions etc. The object itself may also be optically inhomogeneous and/or may have local curved surfaces or inclusions, meaning that the correlations become even more complicated. The simplification mentioned above leads to errors which are non-negligible in many cases. The beam offset SV cannot thereby be correctly calculated in most cases. This means that also Zh1 is usually not exactly known and must be empirically determined. If one considers that the object support TOA has a non-negligible thickness DG, the object OB has an optically effective thickness and the pupil is not a well-defined planar surface in case of the usual zoom microscopes, this results in an effective entrance pupil, the distance of which from the object surface OE Zh1 is displaced with respect to the Z coordinate of the idealised entrance pupil ZEP1.

One of the objectives OBJ2 or OBJ3 of FIG. 1 can be used instead of the objective OBJ1 shown in FIG. 3. These have—together with the motorised zoom body MZK and the actually effective zoom factor β—another numerical aperture NA3, another object field diameter in the object plane OE and another Z coordinate of the entrance pupil. Due to the cost-optimised objective-zoom body combinations OBJ1 with MZK, OBJ2 with MZK, and OBJ3 with MZK, typical in stereomicroscopy and macroscopy, there are no corrected pupil planes fixed over the zoom region and no guaranteed suitability for polarisation optical methods. The value of ZEP1 and the corresponding values of ZEP2 and ZEP3 (not shown in FIG. 3) of the second and third objective-zoom body combinations OBJ2 with MZK and OBJ3 with MZK lie correspondingly far from each other and move with the zoom factor β as a rule with different strengths. When using a coded objective changer COW according to FIG. 1, it is possible for an identical object on an identical transparent object support TOA to be assumed for different objectives OBJ1, OBJ2 and OBJ3 in a stereo microscope system. Therefore, Zh1 and the corresponding values Zh2 and Zh3 (not shown in FIG. 3) of the second and third objective-zoom body combination OBJ2 with MZK and OBJ3 with MZK have corresponding differences.

In addition, there are no defined entrance pupils which are fixed during zooming in the case of the described typical low-priced objective-zoom body combinations OBJ1 with MZK, OBJ2 with MZK, and OBJ3 with MZK. The fulfillment of such a requirement would have clearly made the optical design and the objective construction more difficult. This would have led at least to the objectives being more expensive and to a possibly unacceptable construction size, even if a solution to this were found at all. There are thus in practice no planar fixed-location entrance pupils with the usual minimised image errors. The entrance pupils are thus greatly deformed and migrate upon variation of the zoom factor β and the position of the entrance pupils depends greatly upon the light wavelength.

In case of an image recorded through the right channel R of the objective OBJ1 with the arrangement according to FIG. 3, the contrast without further means is very weak, structures and/or phase differences are as good as unrecognisable. The image has, on the other hand, great homogeneity in relation to brightness.

In a first embodiment the problem is solved by providing a diaphragm in the body of the transmitted light cover which can be displaced in the direction of the optical axis of the observation system. This diaphragm can be set with different zoom positions to the position of the entrance pupil of the optical system. Different contrast effects can be achieved through a displacement perpendicular to the optical axis.

Figure 4:
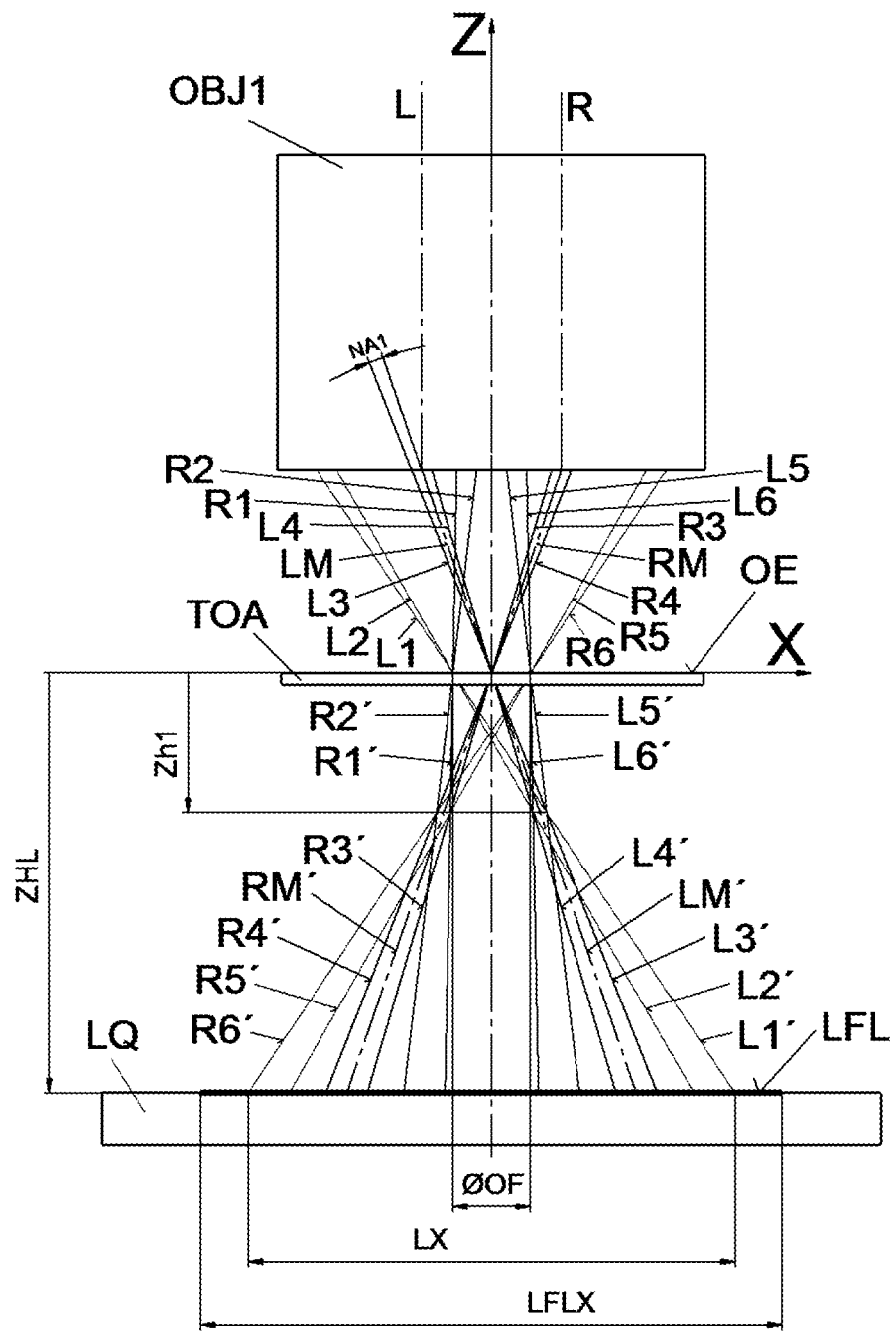
FIG. 4: shows essential components of the beam path in an apparatus according to the invention in a front view.
Figure 5:
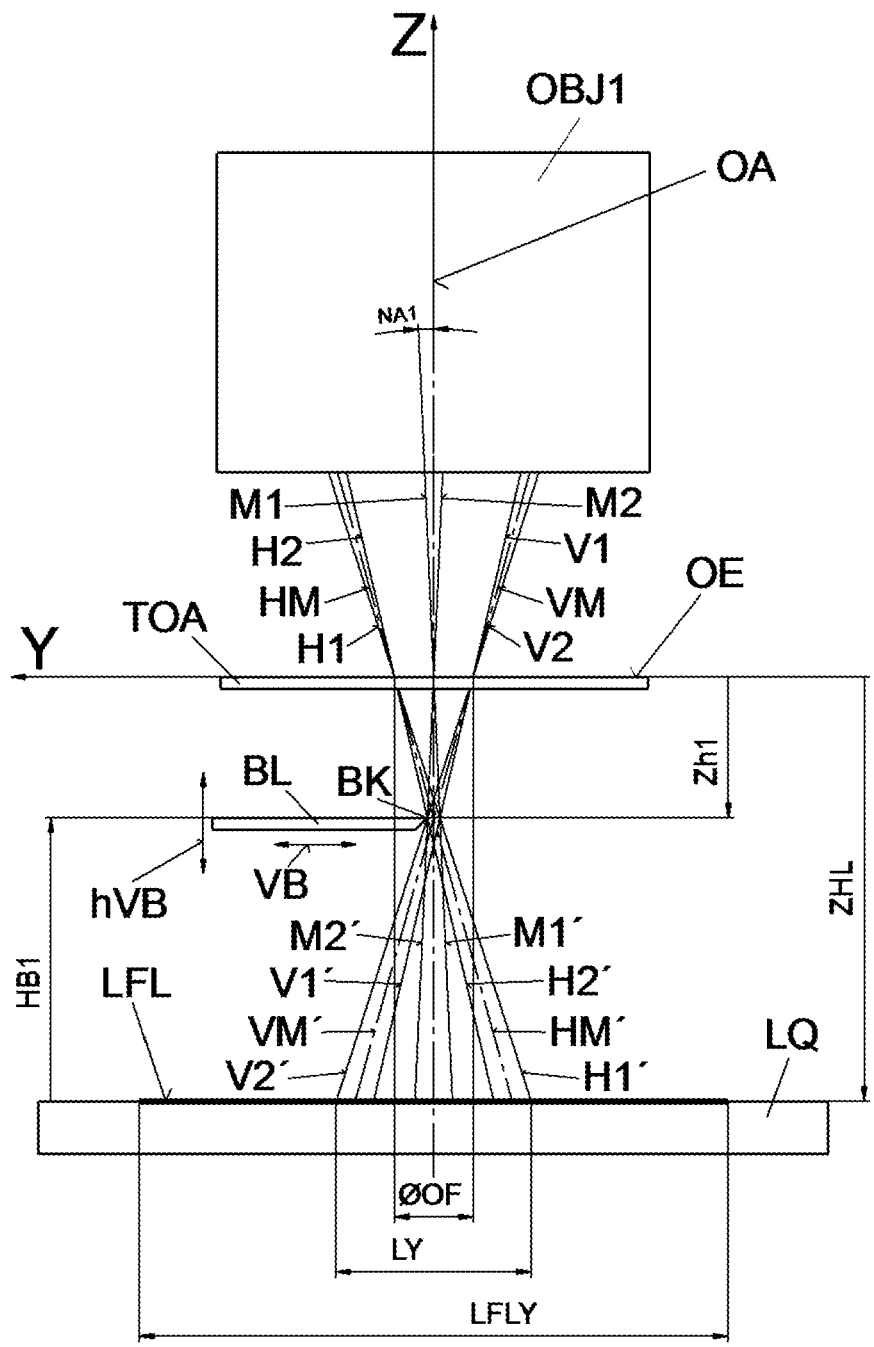
FIG. 5: shows essential components of the beam path in an apparatus according to the invention in a side view with a diaphragm edge.

FIG. 4 shows the front view, FIG. 5 the side view from the left of an arrangement according to the invention. The coordinate system with the axes X, Y and Z aids orientation. R1 to R6 are right light rays/beams in FIG. 4, and L1 to L6 designate left light beams.

FIG. 5 shows the boundary light beams starting from the object plane OE or the top side of the transparent object support TOA, which boundary light beams are particularly relevant to the description of the imaging of the depicted objective OBJ1.

The light beams H1 and H2 and the middle light beam HM come from the rear object field edge, wherein the light beams H1 and H2 represent the theoretical aperture limitations of the depicted objective OBJ1 with the momentarily effective zoom factor R. NA1 refers to the objective aperture of the objective OBJ1 in FIGS. 4 and 5.

Similarly, the light beams V1, V2 and VM come from the front object field edge, wherein V1 and V2 identify the theoretical aperture limitations of the objective OBJ1 shown with the currently effective zoom factor R.

All light beams projected back into the illumination space retain their respective name. Merely an apostrophe is added to indicate consideration of the beam offset SV. The middle light beams in the image space VM and HM thus result, in consideration of the beam offset through the transparent object support TOA, in the light beams VM' and HM' projected back into the illumination space. In FIG. 5, M1 and M2 identify middle light beams.

According to the invention an adjustable diaphragm BL with a diaphragm edge BK is arranged in the installation space between the object plane OE or the upper side of the transparent object support TOA and the light surface LFL of a light source LQ. This diaphragm BL can be adjusted in height, i.e. set along the shift direction hVB in such a way that the diaphragm edge BK lies in an ideal Z diaphragm position Zh1 for the currently active objective OBJ1 in combination with a zoom body MZK, on which a current zoom factor β is set. It can be seen in FIG. 5 that this setting has already taken place, wherein this is only an idealised representation for the purpose of illustration of the principle.

As already set out, the entrance pupils of most objectives are not fixed in position on zoom systems, mainly for cost reasons, and do not comply with any special quality requirements. This leads to the position and form of the entrance pupil not being clearly defined. It is in part also highly dependent upon the light wavelength. The actual beam path is thus clearly more complex and correspondingly complicated to illustrate. In order to describe the main mode of operation, therefore, only the idealised beam path is used.

Due to the abovementioned complex conditions and further unknown influences of the object OB and its environment such as for example the transparent object support TOA, Petri dish with nutrient solution, practical trials to determine and/or set the ideal Z diaphragm position Zh1 are indispensable. Mainly on account of the unknown influences of the object OB and its environment, a suitable operating element is preferably provided, for example an adjust scroll wheel SADJ, is provided to allow the client to vary the diaphragm position perpendicular to the object plane OE.

The ideal diaphragm position is characterised in that at least one diaphragm BL can be freely positioned with at least one linearly extending diaphragm edge BK between the light source LQ and the object plane OE parallel to the surface normal of the object plane OE in the direction hVB and in at least one direction VB perpendicular thereto. The diaphragm BL with diaphragm edge BK can thus be brought through movement in direction hVB of the surface normal of the object plane OE in order to homogenise the illumination into an ideal diaphragm position Zh1, in which it can be optimally adjusted to the currently effective imaging system. The imaging system comprises a zoom body MZK with the current zoom factor β, an objective OBJ1, an object OB and possibly a transparent object support TOA, which can be seen with a sufficiently homogeneous illumination. The contrast strength can be adjusted by displacing the diaphragm BL with the diaphragm edge BK perpendicular to the surface normal of the object plane OE in the direction VB, wherein the diaphragm edge BK is orientated parallel to the object plane OE and perpendicular to the displacement direction VB for the contrast level variation. In principle, no further means for homogenisation of the lighting are provided or required.

When the ideal Z diaphragm position Zh1 has been set, the distance between the lighting surface LFL and the diaphragm BL is then HB1; the distance ZHL results according to FIG. 5 from ZHL=Zh1−HB1.

It can be seen in FIGS. 4 and 5 that the light area LFL of the light source LQ has an extension LFLX in X direction and IFLY in Y direction. For a vignetting-free homogeneous illustration using the objective OBJ1 shown with the momentarily effective zoom factor β, however, only the light area extensions LX in X direction and LY in Y direction are required.

Ideally, the light field dimensions LFLX and LFLY are selected to be at least large enough to allow a vignetting-free homogeneous lighting for each objective under all imaging conditions arising. The form of the light area can hereby be adapted to the actually effective back-projection of the light beams. This then results approximately in an ellipsis with large half-axis in the X direction during 3D observation, or a circle during 2D observation. 2D observation is hereby intended to mean single-channel observation of the sample. 3D observation is correspondingly observation with two channels.

By moving the diaphragm BL positioned at a distance Zh1 from the object plane OE or from the upper side of the transparent object support TOA in the displacement direction VB, the diaphragm BL can be brought into the illumination beam path with the diaphragm edge BK in such a way that certain light beams can be filtered out. The diaphragm is preferably moved along the Y axis as it then acts for the left channel L and the right channel R equally. FIG. 4 shows that a movement of the diaphragm (not shown) at a distance Zh1 in the X direction would not filter out the light beams of the two channels evenly. This would result in unsuitable illumination for 3D images. If the diaphragm BL with the diaphragm edge BK is brought into the illuminating beam path according to FIG. 5, that is to say by moving at a distance Zh1 from the object plane OE or from the top side of the transparent object support TOA, in the displacement direction VB, it does not only act on both channels evenly but instead also on all points of the object field.

According to the arrangement of the diaphragm BL in FIG. 5, the diaphragm edge BK contacts the back-projected light rays V2' and H2' which come from the opposing object field edges. All back-projected light beams are thus contacted between the opposing object field edges by the diaphragm edge BK. If the diaphragm BL is pushed further into the illumination beam path, this results in an even cover of illuminating light beams over the object field, that is to say the lighting remains homogeneous with decreasing brightness, whereby the contrast clearly improves. This was confirmed through practical trials.

Figure 6:
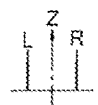
FIG. 6: shows a table of ideal illuminations of different microscope types.

FIG. 6 shows a table with an overview of different imaging systems with optical paths, the beam positions in the entrance plane of the objective and beam positions and beam dimensions in a plane of the light area. The microscope types differ through their imaging systems which have observation channels arranged differently in relation to the objectives.

It is possible with special objective changers within the scope of the stereoscopic observation systems to set the objectives so that a switch can be made between 3D observation and 2D observation.

In the first line of the table, different imaging systems are indicated, namely Discovery 3D, Discovery 2D, Lumar 3D, Lumar 2D and AxioZoom 2D.

Discovery 3D thereby describes a stereo microscope with a left channel L and a right channel R, wherein both channels L, R must be used and illuminated.

Discovery 2D describes a stereo microscope with a left channel L and a right channel R, wherein the objective is arranged at the right channel R so that only the right channel R is to be illuminated.

Lumar 3D is intended to be understood as a fluorescence stereo microscope with a left channel L and a right channel R, wherein both channels L, R are forwardly offset in relation to the object centre in order that a third channel (not shown) for fluorescence excitation can also irradiate the objective. Both channels are thus to be illuminated here.

Lumar 2D describes a fluorescence stereo microscope with a left channel L and a right channel R, wherein likewise both channels are forwardly offset in relation to the object centre so that a third channel (not shown) for fluorescence excitation can irradiate the objective. However, only the right channel is thereby used for observation. That is to say, only the right channel R is to be illuminated.

Finally, AxioZoom 2D describes a macroscope with one channel, that is to say only this one channel is to be illuminated.

The columns two to six in the table in FIG. 6 indicate the abovementioned imaging systems. The first column provides information regarding the content of the table for the different imaging systems.

The second line shows the front views with the principal optical path to the imaging systems, wherein only the main beams are shown. An XYZ coordinate system serves for orientation. The light beams go from a light area LFL and run through a diaphragm plane, an object plane OE, on which a sample to be examined can be located, and an objective OBJ. This is indicated by two symbolic main planes.

The third line shows the top views, thus as seen from above through the objective OBJ, with the principal optical paths to the imaging systems. Only the main beams used on the imaging side are shown. These are represented as bold circles and constitute illumination centres. This third line shows the positions of the main beams on the imaging side in the XY plane. For the imaging systems Discovery 3D, Discovery 2D and AxioZoom 2D, the illumination centres lie on the X axis. On the other hand, for the imaging systems Lumar 3D and Lumar 2D, the illumination centres are forwardly offset and do not therefore lie on the X axis. In addition it can be recognised that the imaging systems, in which two channels are to be illuminated, thus Discovery 3D and Lumar 3D, have two illumination centres, whereas the remaining imaging systems with merely one channel to be illuminated have only one illumination centre.

The bottom line shows the top views, that is to say as seen from above directly onto the light area LFL, with the principally required light area LFL for complete illumination for the corresponding imaging systems. The main beams used as illumination centres are represented by bold circles. The encirclements around these main beams identify the effective portions of the light area. According to the invention the light area LFL is to be covered outside of the encirclements by diaphragms. The entry of scattered light into the objective OBJ is thereby reduced and the contrast is improved. The encirclements around the main beams can be determined through a back-projection of the imaging edge beams, similarly to FIGS. 3 to 5.

Figure 7:
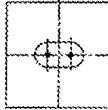
FIG. 7: shows a table with diaphragm forms for the different microscope types.

FIG. 7 shows a table with different diaphragm forms which are suited for the previously described imaging systems.

The diaphragm forms shown can be realised according to the invention with one or preferably more diaphragms. In order to reduce undesired scattered light, the diaphragms are arranged in the diaphragm plane shown in the second line of FIG. 6.

In the second line of the table of FIG. 7, top views, thus views from above onto the diaphragm plane, with the principal optical path to the imaging systems are shown. The optical path is illustrated by the bold circles. In addition the respectively ideal diaphragm form for scattered light reduction is shown. These ideal diaphragm forms are dependent, amongst other things, upon the ideal size of the light area LFL of FIG. 6.

In the third line of the table of FIG. 7, the top views with the principal optical path to the imaging systems are shown. An approximated diaphragm form for scattered light reduction is respectively shown. These diaphragm forms can be realised according to the invention through a combination of an iris diaphragm with two diaphragms each having a linearly extending diaphragm edge. The iris diaphragm and the two diaphragms having a linear diaphragm edge can be displaced in the XY plane independently of each other. The two linear diaphragm edges preferably extend parallel to a connecting direction of the two channels L and R to be illuminated. The ideal diaphragm form from the second line can hereby be approximated very well.

In the fourth line of the table of FIG. 7, the top views are in turn shown with the principal optical path to the imaging systems. Here, a more greatly simplified diaphragm form for scattered light reduction is shown. These diaphragm forms can be realised according to the invention through a combination of four diaphragms each having a linearly extending diaphragm edge. These four diaphragms can in turn be displaced in the XY plane independently of each other.

Figure 8:
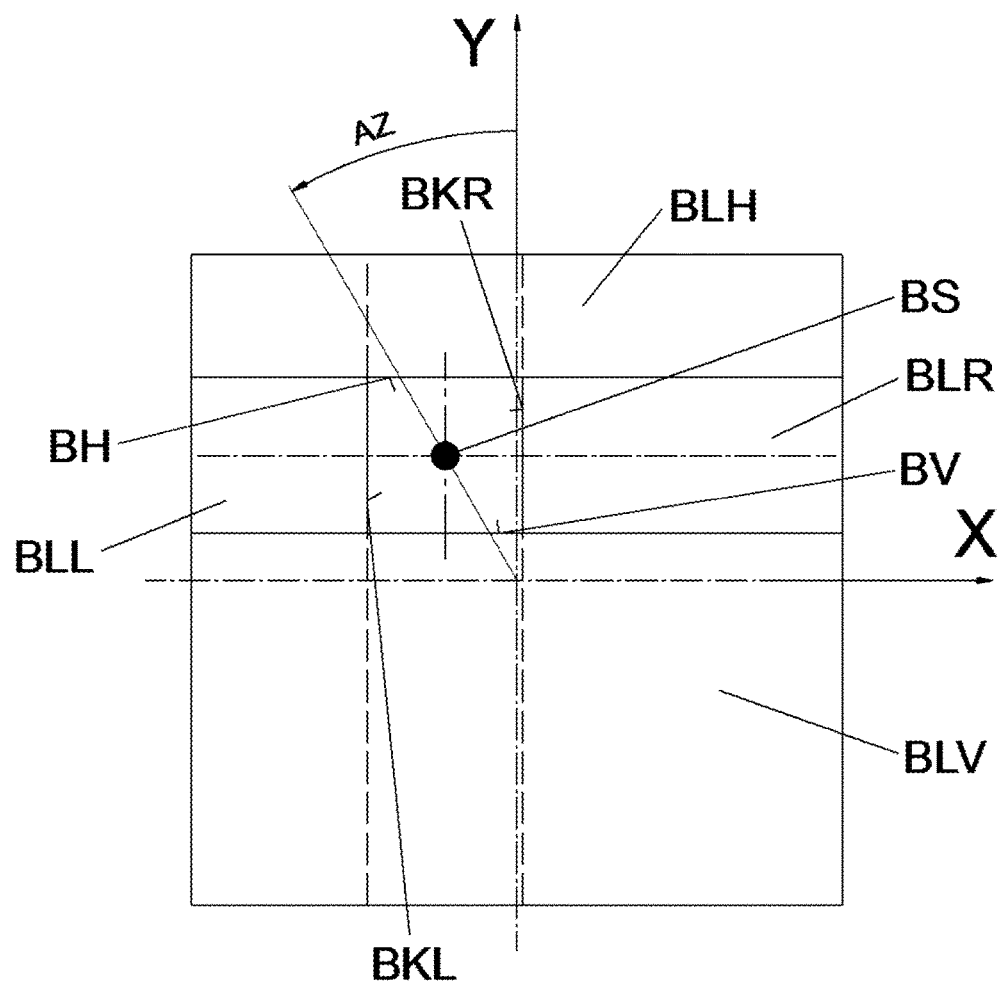
FIG. 8: shows a schematic view of four diaphragms of an apparatus according to the invention which are set for a certain microscope type.

FIG. 8 shows, schematically, four diaphragms of an apparatus according to the invention. The positioning of the diaphragms is adapted to the imaging system Lumar 2D, that is to say the simplified diaphragm form from the bottom line, fifth column of FIG. 7 is set.

The four diaphragms comprise a left diaphragm BLL having a linear diaphragm edge BKL, a right diaphragm BLR having a linear diaphragm edge BKR, a front diaphragm BLV having a linear diaphragm edge BV and a rear diaphragm BLH having a linear diaphragm edge BH. A rectangle is left free between them, in which the illumination centre BS lies. This is arranged at an azimuth angle AZ in relation to the positive half-axis of the XYZ coordinate system.

By displacing the four diaphragms in the XY plane, the other diaphragm forms from the bottom line of the table of FIG. 7 can also be set.

Figure 9:
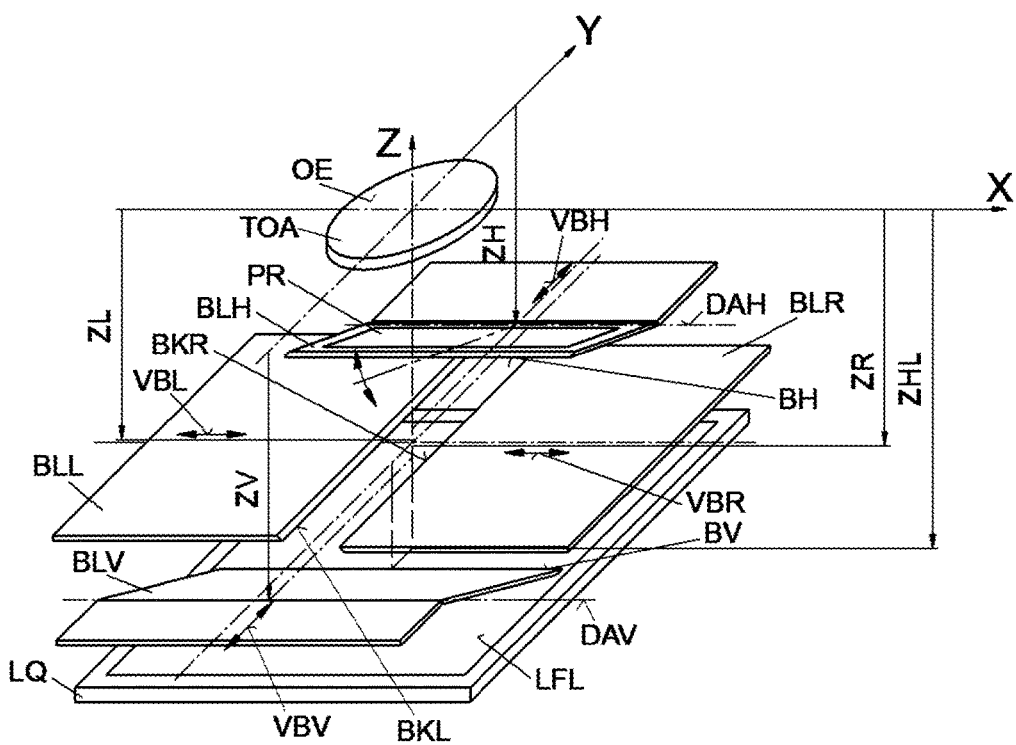
FIG. 9: shows a schematic perspective view of four diaphragms of an apparatus according to the invention.

FIG. 9 shows a schematic perspective illustration of four diaphragms BLL, BLR, BLV and BLH of an apparatus according to the invention. A light source LQ with a light area LFL is present below the diaphragms. The transparent object support TOA which represents the object plane OE is located above the diaphragms.

The diaphragms BLL, BLR, BLV and BLH each have a linear diaphragm edge BKL, BKR, BV and BH so that the simplified diaphragm forms from the fourth line of the table of FIG. 7 can be set. BKL describes the left diaphragm edge and BKR correspondingly the right diaphragm edge. In the positioning of the four diaphragms illustrated, the diaphragm form is adapted to the imaging system Lumar 2D. As shown in the fourth column in FIG. 7, a free space between the four diaphragms is set for the imaging system AxioZoom 2D, said free space being square and the illumination centre BS lying on it.

In order to be able to set the size and position of the free space between the four diaphragms for the respective imaging system, the diaphragms can be displaced in the XY plane.

According to the invention the diaphragms are preferably adjustable not only in the XY plane for the reduction of scattered light but also in the Z direction. The advantages described above can hereby be achieved.

The following references are also relevant in FIG. 9: VBH=displacement direction of the rear diaphragm; VBL: displacement direction of the left diaphragm; VBR=displacement direction of the right diaphragm; and VBV which describes a displacement direction of the front diaphragm. ZH describes in FIG. 9 the Z coordinate of the rear rotation axis DAH. ZL and ZR respectively refer in FIG. 9 to the Z coordinates of the left and right diaphragm edge. Finally, ZV describes the Z coordinate of the front rotation axis DAV.

According to the invention it can be provided that in dependence upon the objective-zoom body combination used, a previously defined diaphragm form is adjusted. With a change from a 2D to a 3D observation, the diaphragm shape adjusts without further action from the user, for instance. The previously defined diaphragm forms are defined by the respective positions of the available diaphragms.

According to the invention a contrast mode "azimuth" can be selected. In this mode, the form of the free space between the diaphragms is fixed but the X-Y position of the free space can be changed. Different contrasts are hereby possible during the observation.

The diaphragms are not required to lie according to the invention in the same Z plane. In the embodiment shown the four diaphragms are offset relative to each other in the Z direction. The diaphragm edge BV of the lowermost diaphragm BLV and the diaphragm edge BH of the uppermost diaphragm BLH are additionally height adjustable. In this connection, it is possible to rotate them about a front rotation axis DAV or a rear rotation axis DAH, respectively. No height adjustment is provided for the left and right diaphragm.

The most ideal form in terms of cost is a linear diaphragm edge BK as this can be easily produced without great resources. Slightly curved diaphragm edges BK can also be used in principle but then, with the tilting of the diaphragm BL with fixed XYZ coordinates of a single point on the diaphragm edge BK with increasing distance from this point along the diaphragm edge BK, the Y and Z values also change, which is in practice difficult to manage. Curves of the diaphragm edge BK which lie in the region of the usual manufacturing tolerances and/or which do not yet lead to visible non-homogeneities do not play a role here.

Furthermore it is possible to use an array which can be switched in terms of pixels such as for example an LCD array as a height-adjustable diaphragm. This design has the advantage that the transmission pattern of the diaphragm can be adapted to the pupil form. In addition, other patterns are also advantageous. The reversal of the diaphragm edge, thus switching to a diaphragm edge offset or rotated by 180°, is then to be realised for example through electronic control. A rotation of the diaphragm is also possible. Last but not least, a rapid change of the transmission pattern to different forms is possible, these forms bringing about, above the flicker frequency of the eye, approximately 50 Hz, a mixed contrast effect.

States of a liquid crystal array 20 to be used as a diaphragm are shown schematically in FIGS. 10 to 14.

Figure 10:
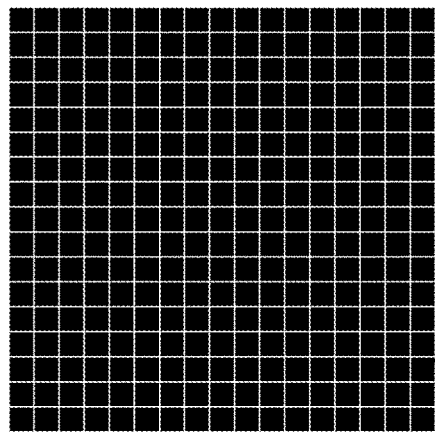
FIGS. 10 to 14: show states of an embodiment in which a liquid crystal array functions as a diaphragm.
Figure 11:
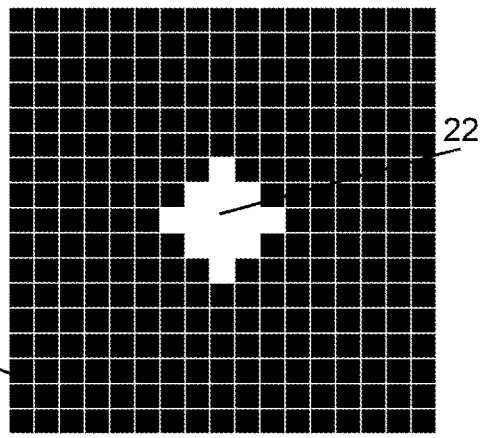
Figure 12:
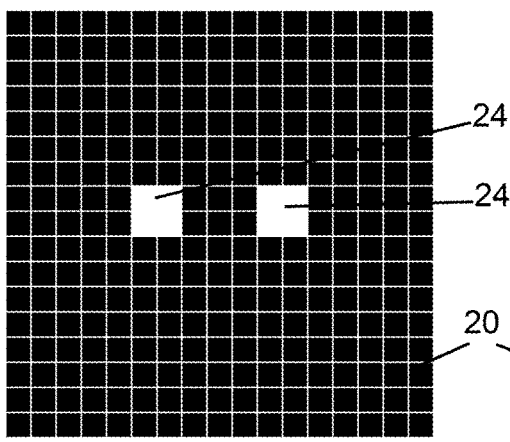
Figure 13:
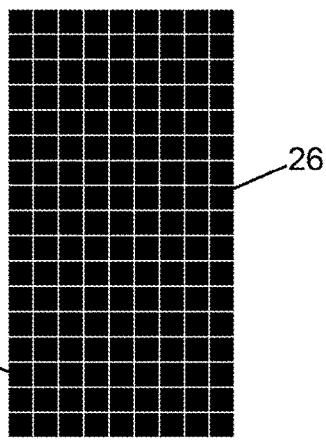
Figure 14:
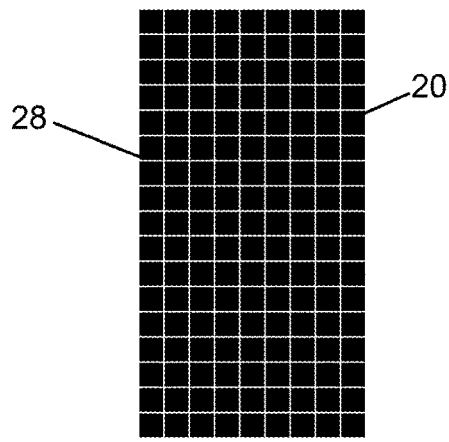

FIG. 10 shows a situation in which all pixels of the liquid crystal array 20 are set as impermeable. In FIG. 11, a central region 22 of the liquid crystal array 20 is transparent. A round diaphragm form can hereby be approximated. FIG. 12 shows a situation with two transparent regions 24. This is suitable for a microscope type with two channels clearly separated from each other. Finally, FIGS. 13 and 14 show cases, in which half of the liquid crystal array 20 is set as impermeable and the other half as transparent. Diaphragm edges 26, 28 are thereby formed which can be used for the apparatus according to the invention and the method according to the invention. Very good approximations to the ideal diaphragm forms shown in the table of FIG. 7 can advantageously be achieved with the liquid crystal array 20.

Without limitation the invention can be generalised in that for example the beam path in the transmitted light cover is folded through deflection optics such as mirrors, and in that lenses are used as relay optics.

With the present invention a cost-effective transmitted light illumination method and an apparatus for transmitted light illumination are provided which are particularly suited for illuminating low-contrast transmitted light objects in the smaller overview magnifications in the bright field on stereo microscopes and macroscopes.

The method provides homogeneous illumination in a very large field of vision. Furthermore, the resolution is not unnecessarily reduced and sufficient illumination intensities are provided. An essential advantage is also that the apparatus according to the invention can be used in a usual construction height HER, see FIG. 1, by transmitted light devices without visible interference. The inventive method can in particular also be combined with other illumination methods so that in principle all illumination methods can be used with a single transmitted light device.

Favourable or optimal illumination settings can thus also be easily set and reproduced by untrained users.

Finally the method is suitable in particular for low cost objective-zoom body combinations which do not have corrected pupil planes fixed over the zoom region and need not compulsorily be suitable for polarisation-optic methods.

LIST OF REFERENCE SYMBOLS

AZ Azimuth angle of the illumination
α Adjustment angle of the deflecting mirror SP
ASPH Aspheric illumination optic
β Currently effective zoom factor of the zoom body
BE Operating unit for the whole system
BH Diaphragm edge rear
BK Diaphragm edge
BKL Diaphragm edge left
BKR Diaphragm edge right
BL Diaphragm
BLH Rear diaphragm
BLL Left diaphragm
BLR Right diaphragm
BLV Front diaphragm
BMAB Operating element for motorised aperture diaphragm MAB
BMFT Operating element for the motorised focussing device
BMZK Operating element for the motorised zoom body
BS Illumination centre
BV Diaphragm edge front
COW Coded objective changer
DA Rotation axis
DAH Rotation axis rear diaphragm
DAV Rotation axis front diaphragm
DL Transmitted light device
E Plane at the level of the object support on the transmitted light device; this plane is generally formed through the upper side of the transmitted light device
EM Electronic module for controlling the whole system (signal processing, etc.)
FF Front area of the light conductor LL
H1 Rear light beam 1
H1' Rear light beam 1 with beam offset through transparent object support TOA or glass plate
H2 Rear light beam 2
H2' Rear light beam 2 with beam offset through transparent object support TOA or glass plate
HB1 Height distance from the light area LFL to the diaphragm BL in the ideal Z diaphragm position for the objective OBJ1 on the zoom body MZK with the current zoom factor β
HER Ergonomically justifiable construction height of the transmitted light device DL
HM Rear middle light beam
HM' Rear middle light beam with beam offset through transparent object support TOA or glass plate
hVB Displacement direction for adapting the diaphragm edge to the ideal Z diaphragm position
K Camera for documentation
KLD Cold light source for supply of light to the transmitted light device DL
L Left image channel
L1 Left light beam 1
L1' Left light beam 1 with beam offset through transparent object support TOA or glass plate
L2 Left light beam 2
L2' Left light beam 2 with beam offset through transparent object support TOA or glass plate
L3 Left light beam 3
L3' Left light beam 3 with beam offset through transparent object support TOA or glass plate
L4 Left light beam 4
L4' Left light beam 4 with beam offset through transparent object support TOA or glass plate
L5 Left light beam 5
L5' Left light beam 5 with beam offset through transparent object support TOA or glass plate
L6 Left light beam 6
L6' Left light beam 6 with beam offset through transparent object support TOA or glass plate
LFL Light area of the light source LQ
LFLX Expansion of the light area LFL in X direction
LFLY Expansion of the light area LFL in Y direction LL Light conductor
LM Left mid-light beam
LM' Left mid-light beam with beam offset through transparent object support TOA or glass plate
LQ Light source
LX Light area expansion in the X direction for consideration of the objective edge beams
LY Light area expansion in the Y direction for consideration of the objective edge beams
M1 Middle light beam 1
M1' Middle light beam 1 with beam offset through transparent object support TOA or glass plate
M2 Middle light beam 2
M2' Middle light beam 2 with beam offset through transparent object support TOA or glass plate
MAB Motorised aperture diaphragm
MFT Motorised focussing device
MZK Motorised zoom body
NA Numerical aperture
NA1 Numerical aperture of objective No. 1
OA Optical axis of the objective
OBJ Objective
OBJ1 Objective No. 1
OBJ2 Objective No. 2 with EP remote from OE
OBJ3 Objective No. 3
OE Object plane (without object identical to the object support)
OH Height of the object OB incl. the ambient medium (e.g. Petri dish with nutrient solution) from the object support, or from the upper side of the transparent object support TOA, to the object plane OE
OK Ocular
RH Rear edge beam between light area and objective
RL Ring light RL, which is optionally mountable in the table
RM Right mid-light beam
RM' Right mid-light beam with beam offset through transparent object support TOA or glass plate
RV Front edge beam between light area and objective
SO Opening distance from the diaphragm-side edge beam of the back-projected image beams to the optical axis OA, which is covered by the diaphragm BL displaced by the displacement path OOE pointing towards the object plane OE
SP Deflection mirror
SR1 Operating element 1 in the transmitted light device DL
SR2 Operating element 2 in the transmitted light device DL
SR3 Operating element 3 in the transmitted light device DL
ST1 Light beam 1
ST2 Light beam 2
ST3 Light beam 3
ST4 Light beam 4
ST5 Light beam 5
SV Beam offset
T Objective barrel
TOA Transparent object support
TR Carrier
V1 Front light beam 1
V1' Front light beam 1 with beam offset through transparent object support TOA or glass plate
V2 Front light beam 2
V2' Front light beam 2 with beam offset through transparent object support TOA or glass plate
VB Displacement direction of the diaphragm BL for contrast variation
VBH Displacement direction of the rear diaphragm for contrast variation
VBHH Displacement direction of the lever adjustment for the rear diaphragm
VBL Displacement direction of the left diaphragm
VBLH Displacement direction of the rear diaphragm parallel to the light area LFL
VBLV Displacement direction of the front diaphragm parallel to the light area LFL
VBR Displacement direction of the right diaphragm
VBV Displacement direction of the front diaphragm
VBVH Displacement direction of the lever adjustment for the front diaphragm
VM Front mid-light beam
VM' Front mid-light beam with beam offset through transparent object support TOA or glass plate
VR Displacement direction
$\omega$ Angle of inclination of the front diaphragm BLV in relation to the object plane OE
X X coordinate axis of the XYZ coordinate system
Y Y coordinate axis of the XYZ coordinate system
YH Y coordinate of the rear rotation axis DAH
Z Z coordinate axis of the XYZ coordinate system
ZEP1 Z coordinate of the entrance pupil for objective No. 1 in the current zoom magnification
Zh1 Z coordinate of the diaphragm edge in the ideal Z diaphragm position for the objective No. 1 in the current zoom magnification
ZH Z coordinate of the rear rotation axis DAH
ZHL Z coordinate of the light area LFL
ZL Z coordinate of the left diaphragm edge
ZR Z coordinate of the right diaphragm edge
Zvmax Greatest possible Z coordinate of the front diaphragm edge without table
ZV Z coordinate of the front rotation axis DAV

The invention claimed is:

1. A transmitted light illumination apparatus for a light microscope with a changing effective entrance pupil of an objective, the apparatus comprising:
a light source for emitting an illuminating light bundle,
a holding device for holding a sample to be examined, and
at least two diaphragm edges to trim the illuminating light bundle,
wherein said two diaphragm edges can be moved relative to each other,
wherein the diaphragm edges are arranged between the holding device and the light source,
wherein the diaphragm edges extend transversely to an optical axis of the light microscope, which can be positioned in an operating state on the transmitted light illumination apparatus,
wherein an optical path of the illuminating light between the diaphragm edges and a sample held by the holding device is free of beam-focusing components,
a mechanical variable positioning device for variably positioning the diaphragm edges in a direction transverse to the optical axis,
a control device configured to position the diaphragm edges in the direction transverse to the optical axis in dependence upon a selected objective, a position of the selected objective, a type of zoom system used, and a zoom magnification of the zoom system via the mechanical variable positioning device for variably positioning the diaphragm edges in a direction transverse to the optical axis, and
a mechanical variable positioning system for positioning the diaphragm edges in a direction of the optical axis,
wherein said control device is configured to position said diaphragm edges in the direction of the optical axis in dependence upon the selected objective, the position of the selected objective, the type of zoom system used, and the zoom magnification of the zoom system, and wherein positions of the diaphragm edges in the direction of the optical axis are variable irrespectively of positions of the diaphragm edges transversely to the optical axis, and wherein the diaphragm edges are freely adjustable between an object plane and the light source.

2. The apparatus as defined in claim 1, wherein the control device is configured to realize different position settings of the diaphragm edges at least for the following microscope types:
stereo microscope with one channel to be illuminated,
stereo microscope with two channels to be illuminated,
stereo microscope with one channel to be illuminated and one excitation channel for fluorescence excitation,
stereo microscope with two channels to be illuminated and one excitation channel for fluorescence excitation and
macroscope with one channel to be illuminated.

3. The apparatus as defined in claim 1, wherein for contrast adjustment, the control device is configured to position the diaphragm edges with the mechanical variable positioning device for variably positioning the diaphragm edges in a direction transversely to the optical axis.

4. The apparatus as defined in claim 1, further comprising an electrical interface for determining the type of zoom system, the selected objective, the position of the selected objective and the zoom magnification of the zoom system.

5. The apparatus as defined in claim 1, wherein an LCD array is configured to form the diaphragm edge.

6. The apparatus as defined in claim 1, wherein at least one of the two diaphragm edges is formed by an iris diaphragm.

7. The apparatus as defined in claim 1, wherein the control device has a storage device, in which position settings of the at least two diaphragm edges are stored for positioning the at least two diaphragm edges in dependence upon at least one of a microscope setting and a microscope configuration.

8. The apparatus as defined in claim 7, wherein the storage device stores position data concerning a set position of the at least two diaphragm edges.

9. The apparatus as defined in claim 1, wherein a motorised aperture diaphragm for setting an observation aperture is provided in an imaging optical path of the light microscope and the control device is configured to position the aperture diaphragm in dependence upon positions of the at least two diaphragm edges.

10. A transmitted light illumination method for a light microscope with changing effective entrance pupil of an objective,
in which a sample held by a holding device is subjected to illuminating light from a light source and
in which an illuminating light bundle emitted from the light source is trimmed by at least two diaphragm edges arranged between the holding device and the light source, wherein
a selected objective, a position of the selected objective, a type of zoom system used, and a zoom magnification of the zoom system is determined, and the diaphragm edges extend transversely to an optical axis and are positioned in a direction transverse to the optical axis in dependence upon the selected objective, the position of the selected objective, the type of zoom system used, and the zoom magnification of the zoom system,
wherein positions of the at least two diaphragm edges in the direction of the optical axis can be varied irrespectively of positions of the diaphragm edges transversely to the optical axis,
wherein said diaphragm edges are positioned in the direction of the optical axis in dependence upon the selected objective, the position of the selected objective, the type of zoom system used, and the zoom magnification of the zoom system,
wherein the diaphragm edges are freely adjustable between an object plane and the light source, and
wherein an optical path of the illuminating light between the diaphragm edges and a sample held by the holding device is free of beam-focusing components.

11. The method as defined in claim 10,
wherein different position settings of the diaphragm edges are offered to a user,
wherein each of the different position settings is optimised having regard to a respective illumination parameter,
wherein the illumination parameters are a measure for at least one of: an intensity gradient of a microscope image in a direction transversely to the diaphragm edge, an image contrast of the microscope image, a contrast range, image homogeneity and a shadow in the microscope image.

12. The method as defined in claim 10,
wherein the diaphragm edges are positioned along the direction of the optical axis depending upon the position of the effective entrance pupil of the objective.

* * * * *